United States Patent
Shimba (10) Patent No.: US 12,003,680 B2
(45) Date of Patent: Jun. 4, 2024

(54) IMAGE PROCESSING SYSTEM AND NON-TRANSITORY COMPUTER READABLE MEDIUM STORING PROGRAM FOR CONTROLLING TIMING OF CONNECTION USING VIRTUAL LEASED LINE

(71) Applicant: FUJIFILM Business Innovation Corp., Tokyo (JP)

(72) Inventor: Hiroaki Shimba, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 362 days.

(21) Appl. No.: 17/380,048

(22) Filed: Jul. 20, 2021

(65) Prior Publication Data

US 2022/0232141 A1    Jul. 21, 2022

(30) Foreign Application Priority Data

Jan. 18, 2021  (JP) ................. 2021-005477

(51) Int. Cl.
*H04N 1/00* (2006.01)
*H04N 1/327* (2006.01)

(52) U.S. Cl.
CPC ..... *H04N 1/00933* (2013.01); *H04N 1/00344* (2013.01); *H04N 1/00925* (2013.01); *H04N 1/32767* (2013.01); *H04N 1/32786* (2013.01); *H04N 2201/0094* (2013.01)

(58) Field of Classification Search
CPC ........... H04N 1/00933; H04N 1/00344; H04N 1/00925; H04N 1/32767; H04N 1/32786; H04N 2201/0094

USPC ....................................................... 358/1.14
See application file for complete search history.

(56) References Cited

U.S. PATENT DOCUMENTS

2014/0268208 A1*  9/2014  Hirakata ............. H04N 1/4406
                                                          358/1.14

FOREIGN PATENT DOCUMENTS

| JP | 2009064144 | 3/2009 |
|----|------------|--------|
| JP | 2011053985 | 3/2011 |
| JP | 2013196530 | 9/2013 |
| JP | 2020048092 | 3/2020 |

* cited by examiner

*Primary Examiner* — Allen H Nguyen
(74) *Attorney, Agent, or Firm* — JCIPRNET (57) ABSTRACT

An image processing system includes: a first processor that is mounted on an image processing apparatus including at least one of an image forming unit that performs processing of forming an image on a medium or an image scanning unit that performs processing of scanning an image on a medium; and a second processor that is mounted on a control apparatus that is connected to the image processing apparatus via a virtual leased line, and controls a part of at least one of the processing of forming an image on a medium or the processing of scanning an image on a medium performed by the image processing apparatus, in which the first processor is configured to: control a timing of connection using the virtual leased line with the control apparatus according to a function used by a user among functions of the image processing apparatus.

11 Claims, 7 Drawing Sheets

USER MANAGEMENT INFORMATION

| ORGANIZATION ID | AUTHENTICATION INFORMATION | | CONNECTION INFORMATION | | CONTROL APPARATUS ADDRESS | CONTRACT INFORMATION |
|---|---|---|---|---|---|---|
| | USER ID | PASSWORD | VPN ROUTER ADDRESS | AUTHENTICATION DATA | | |
| K001 | U00101 | pwd01 | 123.456.789.012 | | 123.456.789.012 | ONLY MONOCHROME PRINTING |
| | U00102 | pwd02 | | | | |
| K002 | U00201 | pwd03 | 123.456.789.123 | | 123.456.789.123 | |
| . . . | | | | | | |

FIG. 5B

IMAGE PROCESSING SYSTEM AND NON-TRANSITORY COMPUTER READABLE MEDIUM STORING PROGRAM FOR CONTROLLING TIMING OF CONNECTION USING VIRTUAL LEASED LINE

CROSS-REFERENCE TO RELATED APPLICATIONS

This application is based on and claims priority under 35 USC 119 from Japanese Patent Application No. 2021-005477 filed Jan. 18, 2021.

BACKGROUND

(i) Technical Field

The present invention relates to an image processing system and a non-transitory computer readable medium storing a program.

(ii) Related Art

JP2020-048092A proposes a technology for separating an image processing apparatus in a local network and a control apparatus outside the local network and performing image processing performed by the image processing apparatus on the side of the control apparatus according to hardware specifications of the image processing apparatus and contract services. In a case where a control apparatus of a certain organization controls a plurality of image processing apparatuses to perform similar image processing by using this technology, a user belonging to the organization can use the image processing apparatuses with identical usability even in any of local networks in which the image processing apparatuses are installed.

In this case, from the viewpoint of security, for example, it is preferable to establish a virtual leased line, a so-called virtual private network (VPN) between the image processing apparatus and the control apparatus, and exchange information between the image processing apparatus and the control apparatus via the VPN.

In order to facilitate a VPN connection, in JP2013-196530A, a device in which VPN connection information necessary for connecting to the VPN is recorded is connected to a PC, and the PC is made to use the VPN connection information to make the VPN connection, and in a case where the device is disconnected from the PC, the VPN is automatically disconnected.

Further, in JP2011-053985A, a terminal transmits identification information to a setting information distribution server, and the setting information distribution server replies connection destination information necessary for connecting to the VPN corresponding to the identification information to the terminal and makes the PC use the connection destination information to make a VPN connection.

In this way, in the related art, a technique has been proposed in which the VPN is automatically connected without having the user input the information necessary for connecting to the VPN each time.

SUMMARY

Incidentally, the timing of communication via the virtual leased line varies depending on the function used by the user.

However, in the related art, the timing of connecting the virtual leased line is not controlled by the function used by the user. In other words, even though it was not the timing to use the virtual leased line, the virtual leased line was automatically connected according to acquisition of the information necessary for connecting to the virtual leased line. In this way, it is not preferable from the viewpoint of security that the virtual leased line is connected for a long time from when it is not necessary, for example. On the other hand, it is troublesome to let the user operate to connect the virtual leased line when necessary.

Another example of related art includes JP2009-064144A.

Aspects of non-limiting embodiments of the present disclosure relate to an image processing system and a non-transitory computer readable medium storing a program that improve the convenience of a user for communication via a virtual leased line as compared with the case where the timing of connection of the virtual leased line is not controlled according to a function used by the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including: a first processor that is mounted on an image processing apparatus including at least one of an image forming unit that performs processing of forming an image on a medium or an image scanning unit that performs processing of scanning an image on a medium; and a second processor that is mounted on a control apparatus that is connected to the image processing apparatus via a virtual leased line, and controls a part of at least one of the processing of forming an image on a medium or the processing of scanning an image on a medium performed by the image processing apparatus, in which the first processor is configured to: control a timing of connection using the virtual leased line with the control apparatus according to a function used by a user among functions of the image processing apparatus.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Figure 1:
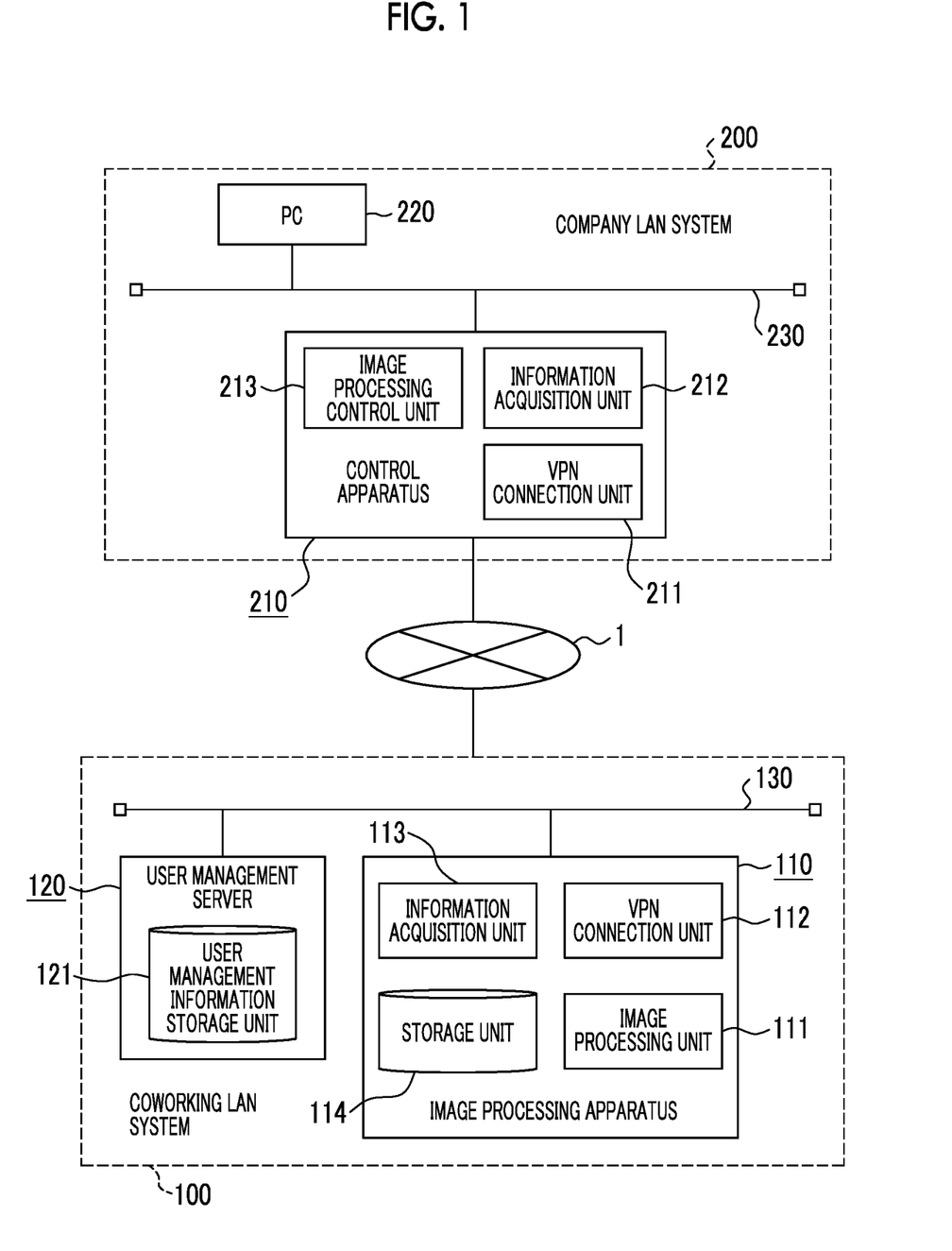
FIG. 1 is a block configuration diagram showing an image processing system according to an exemplary embodiment.

FIG. 1 is a block configuration diagram showing an image processing system according to an exemplary embodiment of the present invention. FIG. 1 shows a configuration in which a coworking local area network (LAN) system 100 and a company LAN system 200 are connected via a network 1 configured as the Internet or the like. The image processing system according to the present exemplary embodiment can be achieved by combining, as hardware, traditional computers and the like, and characteristic image processing in the present exemplary embodiment is controlled by software operating on each computer as will be described later.

The coworking LAN system 100 is a LAN system installed in a coworking space. In the present exemplary embodiment, a coworking space will be described as an example of a shared space in which a plurality of users who do not belong to the identical organization coexist. Other shared spaces include shared offices. The "organization" refers to a group configured to achieve a particular purpose. In the present exemplary embodiment, a company will be described as an example of the organization. Accordingly, in the following description, the "organization" and the "company" are used synonymously.

The company LAN system 200 is a LAN system installed in the company. As described above, the "company" is an example of an organization to which a user who uses the coworking space belongs.

Since the coworking LAN system 100 may be used by users belonging to different companies, the company LAN system 200 is constructed for each company to which each user belongs. On the other hand, since a user belonging to an organization may use a plurality of coworking spaces, a plurality of coworking LAN systems 100 may be provided. However, since the company LAN system 200 of each company has the configuration shown in FIG. 1, and the coworking LAN system 100 installed in the coworking space has the configuration shown in FIG. 1, only one system is shown for each. The coworking LAN system 100 and the company LAN system 200 are each connected to the network 1 such as the Internet.

The coworking LAN system 100 in the present exemplary embodiment is configured such that an image processing apparatus 110 and a user management server 120 are connected to each other via a LAN 130.

The image processing apparatus 110 is installed in the coworking space and is used only by the users of the coworking space. More specifically, the image processing apparatus 110 is available to users belonging to organizations that sign a contract with a manager of the coworking space.

The image processing apparatus 110 in the present exemplary embodiment is achieved by an image forming apparatus such as a multifunction device having various image processing functions such as a printing function, a copying function, and a scanning function, and is a device having a built-in computer. The image processing apparatus 110 includes a CPU as a first processor, a ROM, a RAM, an HDD, a scanner as an image scanning device that scans an image on a medium such as a sheet, a print engine as an image forming device that forms an image on a medium, an operation panel that receives instructions from users and displays information, and a network interface that connects communication lines such as the network 1 and the LAN 130 to each other. The image processing apparatus 110 may include an external medium interface for connection with an external memory device such as a USB memory or a flash memory, and a wireless communication unit that performs short-range wireless communication with a mobile terminal.

In the present exemplary embodiment, the "image processing" includes not only processing such as forming and scanning directly performed on an image, but also a series of processing including pre-processing of performing image processing such as forming and reading of an image in a broader sense (for example, login, VPN connection, processing of acquiring an image, and the like) and post-processing (for example, image storage processing, VPN disconnection, logout, and the like).

The image processing apparatus 110 includes an image forming unit that performs processing of forming an image on a medium and an image scanning unit that performs processing of scanning an image on a medium. However, the image processing apparatus may be configured to include at least one of an image forming unit or an image scanning unit. The image processing apparatus 110 includes an image processing unit 111, a VPN connection unit 112, an information acquisition unit 113, and a storage unit 114. The components not used in the description of the present exemplary embodiment are omitted from the drawings.

The image processing unit 111 executes image processing under control by a control apparatus 210 based on apparatus information and contract information in response to a request from the user. The image processing unit 111 in the present exemplary embodiment corresponds to the image forming unit and the image scanning unit described above, and provides various image processing functions according to the hardware and software included in the image processing apparatus 110. However, each user who is permitted to use the coworking space may not be able to use all the functions provided by the image processing apparatus 110, and can use the functions within a range specified in the contract information regarding the use of the coworking space.

The VPN connection unit 112 acquires address information (for example, IP address) of the control apparatus 210 installed in the company LAN system 200 of the company to which the user belongs in response to a request from the user, and performs VPN connection, which is a virtual leased line, with the company LAN system 200 to which the user belongs. Specifically, the VPN is established in cooperation with a VPN connection unit 211. In the present exemplary embodiment, connection between two parties, that is, between the coworking LAN system 100 and the company LAN system 200 so as to be communicable by VPN in the case of the present exemplary embodiment is referred to as "VPN connection". The VPN connection unit 112 disconnects the VPN connected in response to a disconnection request. The information acquisition unit 113 acquires information necessary for controlling the VPN connection and the image processing as will be described in detail later.

Various information is stored in the storage unit 114, and specific information will be described together with the description of the operation.

Each of the components 111 to 113 in the image processing apparatus 110 is achieved by a cooperative operation of a computer mounted on the image processing apparatus 110 and a program operating on a CPU mounted on the computer. The storage unit 114 is achieved by the HDD mounted on the image processing apparatus 110. Alternatively, a storage unit in the RAM or the coworking LAN system 100 may be used via the LAN 130.

The user management server 120 is a server used for managing users who are permitted to use the coworking space by contract. The user management server 120 has a user management information storage unit 121. The user management information storage unit 121 may be achieved by the HDD mounted on the image processing apparatus 110.

Figure 2:
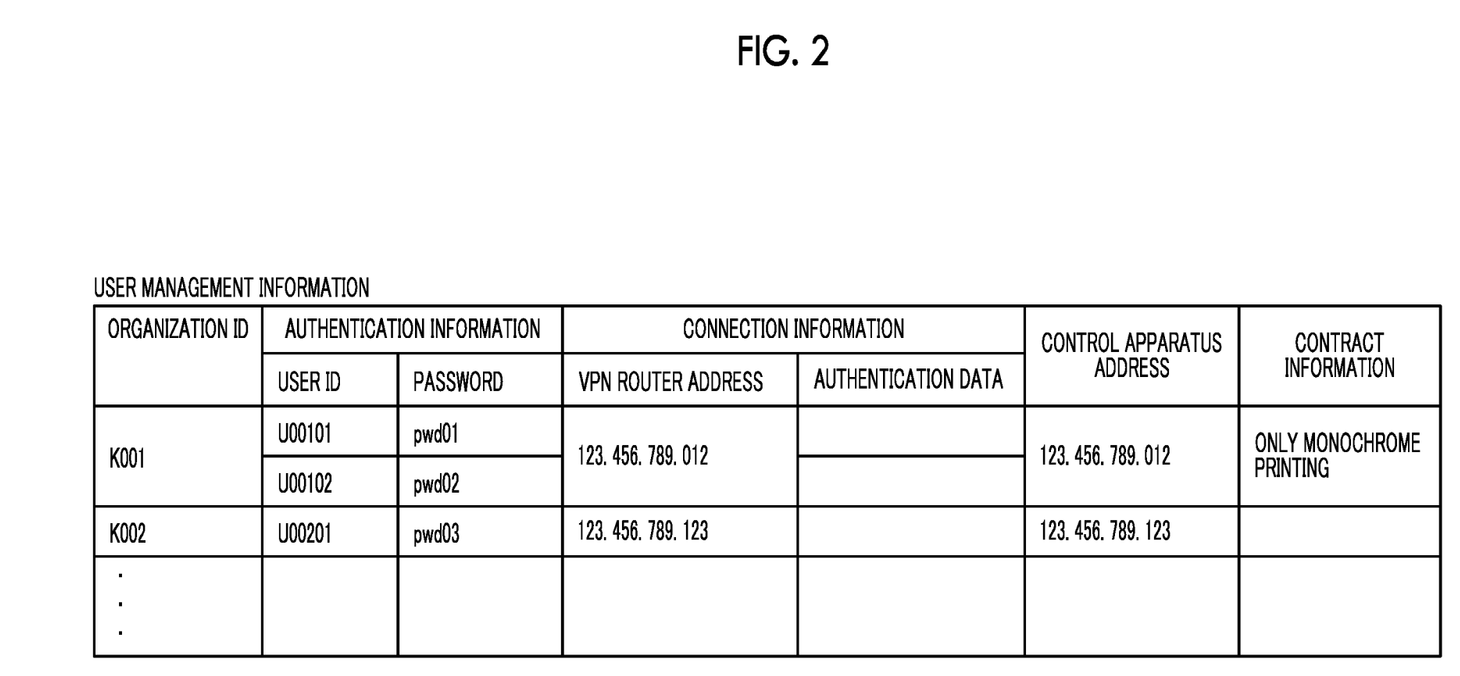
FIG. 2 is a diagram showing an example of a data configuration of user management information stored in a user management information storage unit in the present exemplary embodiment.

FIG. 2 is a diagram showing an example of a data configuration of user management information stored in the user management information storage unit 121 in the present exemplary embodiment. The user management information in the present exemplary embodiment includes an organization ID, authentication information, connection information, control apparatus address, and contract information. The organization ID is identification information of the organization that signs a contract with the manager of the coworking space. The authentication information is information necessary, when the image processing apparatus 110 is used in the organization, that is, information necessary, when the user logs in to the image processing apparatus 110, and is set for each individual who uses the image processing apparatus 110. As the authentication information, a set of a user ID and a password, which is information for identifying the user, is set. The user management server 120 in the present exemplary embodiment has a function of an authentication server by retaining and managing the authentication information. The connection information includes information necessary for connection with the company LAN system 200. As a VPN router address included in the connection information, the IP address of the VPN router installed in the company LAN system 200 of the organization is set as the address information. In the present exemplary embodiment, since the control apparatus 210 has a function as a VPN router, the IP address of the control apparatus 210 is set. Authentication data necessary for establishing connection with the VPN router is set as authentication data. The authentication data is defined by a policy of the VPN router, such as a user certificate and a passcode. At least the address information of the VPN router may be included in the connection information. The IP address of the control apparatus 210 is set as the control apparatus address. The contract information is information regarding the contract signed between the manager of the coworking space and the company. The contract information includes service information indicating contents of services available to the users of the organization. For example, even though the image processing apparatus 110 has functions of color printing and monochrome printing as a color mode, a user belonging to a company permitted to use only the monochrome printing by contract is permitted to use only the monochrome printing.

The company LAN system 200 is configured such that the control apparatus 210 and a PC 220 are connected via the LAN 230.

The control apparatus 210 controls a part of processing of forming an image on the medium and processing of scanning the image on the medium executed by the image processing apparatus 110. However, the control apparatus may be configured to control a part of at least one of the processing of forming an image or the processing of scanning an image according to the image processing function of the image processing apparatus 110. The control apparatus 210 can be achieved by a general-purpose hardware configuration such as a traditional personal computer (PC). That is, the image processing apparatus 110 includes a CPU as a second processor, a ROM, a RAM, an HDD, a user interface such as an operation panel that receives instructions from users and displays information, and a network interface that connects communication lines such as the network 1 and the LAN 230 to each other.

The control apparatus 210 includes a VPN connection unit 211, an information acquisition unit 212, and an image processing control unit 213. The components not used in the description of the present exemplary embodiment are omitted from the drawings.

The VPN connection unit 211 has a function as a VPN router, and performs the VPN connection with an external network system, that is, the coworking LAN system 100 in the case of the present exemplary embodiment. The VPN connection unit 211 in the present exemplary embodiment relays data exchanged between the image processing apparatus 110 included in the coworking LAN system 100 connected via the VPN and the control apparatus 210. Then, the VPN connection unit 211 disconnects the VPN at a predetermined timing.

The information acquisition unit 212 acquires information necessary for controlling the execution of image processing in the image processing apparatus 110. Specifically, apparatus information indicating the apparatus configuration of the image processing apparatus 110 and contract information regarding the use of the image processing apparatus 110 of the organization ("company" in the present exemplary embodiment) are acquired from the image processing apparatus 110 via the VPN connection unit 211. The apparatus information may include, for example, specification information indicating a hardware configuration or a software configuration included in the image processing apparatus 110, or the apparatus information may include ability information indicating ability of a service or a function achieved by the hardware configuration or the software configuration included in the image processing apparatus 110. The image processing control unit 213 controls the execution of the image processing in the image processing apparatus 110 according to the apparatus information and the contract information.

Each of the components 211 to 213 in the control apparatus 210 is achieved by a cooperative operation of a computer forming the control apparatus 210 and a program operated by a CPU mounted on the computer.

The PC 220 is a form of an information processing apparatus used by a user belonging to the company. In the present exemplary embodiment, the user who uses the PC 220 is also a user who uses the image processing apparatus 110 in the coworking space.

The programs used in the present exemplary embodiment can be provided not only by a communication unit but also while being stored in a computer-readable recording medium such as a CD-ROM or a USB memory. The programs provided by the communication unit and the recording medium are installed on the computer, and various types of processing are achieved by sequentially executing the programs by the CPU of the computer.

Next, an operation in the present exemplary embodiment will be described. First, the details of the processing performed at the time of the VPN connection in the present exemplary embodiment will be described with reference to a sequence diagram shown in FIG. 3.

Figure 3:
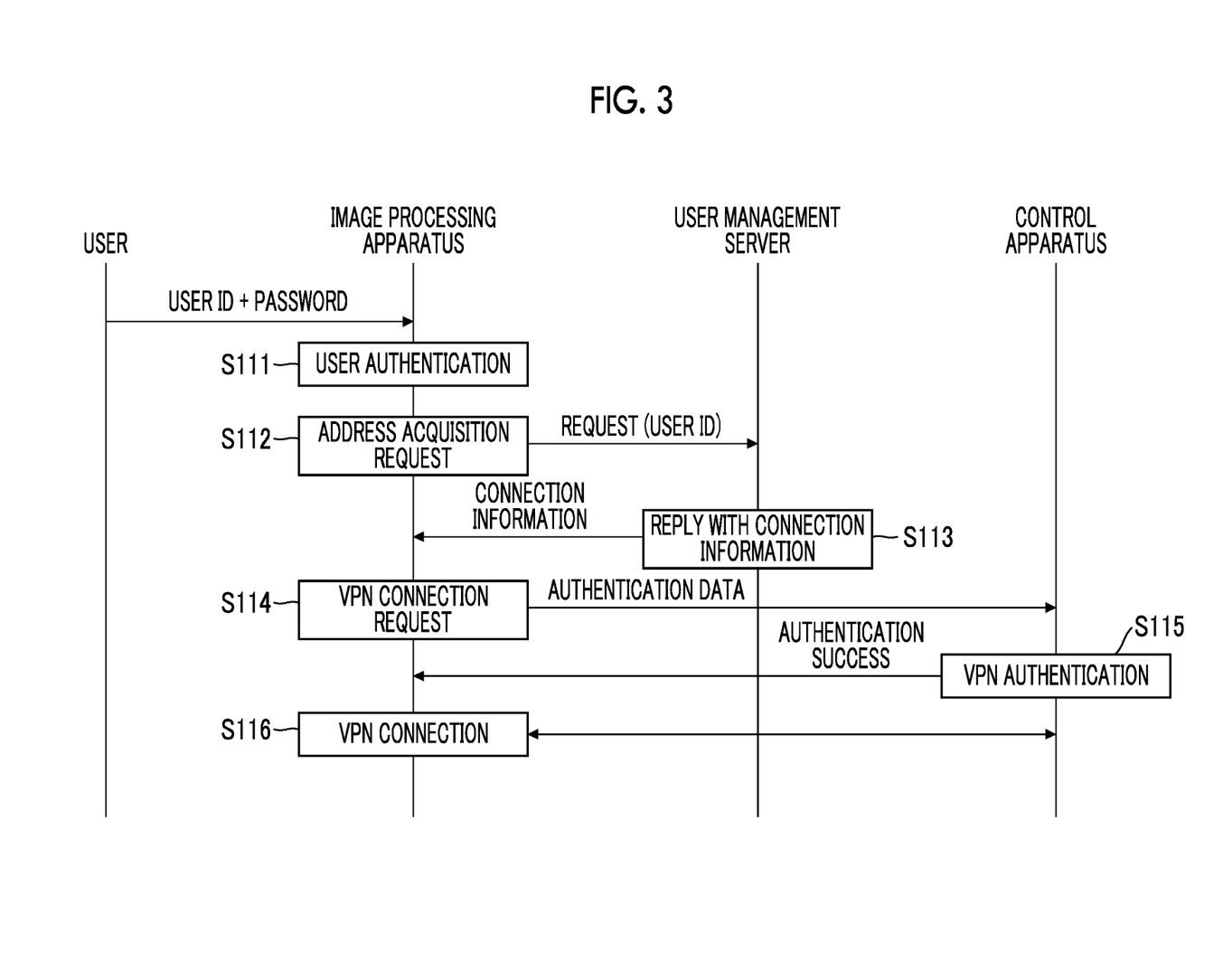
FIG. 3 is a sequence diagram showing processing performed at the time of VPN connection in the present exemplary embodiment.

In a case where the user in the coworking space wants to start using the image processing apparatus 110, the user inputs, as the authentication information, a user ID and a password from a predetermined screen displayed by operating the operation panel of the image processing apparatus 110. The image processing apparatus 110 performs the user authentication by collating a set of the input user ID and password with the authentication information registered in the user management information (step S111). The user authentication performed herein is positioning as authentication for specifying the control apparatus 210 as a VPN connection destination rather than user authentication for using the image processing apparatus 110. However, in the present exemplary embodiment, these pieces of authentication will not be separated. That is, the user attempts to log in by inputting the authentication information. Here, the description will be continued on the assumption that the authentication has succeeded, that is, the login to the image processing apparatus 110 has succeeded.

In the present exemplary embodiment, the user operates the operation panel of the image processing apparatus 110, and thereby the user logs in to the image processing apparatus, but the login method is not limited to this method. For example, in a case where a user brings a mobile terminal that stores authentication information and connection information to a coworking space, the mobile terminal may be wirelessly connected to the image processing apparatus 110 by Bluetooth (registered trademark), Wi-Fi (registered trademark), or the like so that the image processing apparatus 110 acquires the authentication information and the connection information. Alternatively, in a case where an IC card reader is connected to the image processing apparatus 110 and the user carries an IC card in which authentication information and connection information are recorded, the user may have the image processing apparatus 110 acquire the authentication information and the connection information by holding the carried IC card over the IC card reader. In a case where the system is configured in this way, it is not necessary to set the authentication information and the connection information in the user management information retained by the user management server 120.

Subsequently, the information acquisition unit 113 transmits, to the user management server 120, an address acquisition request including the user ID that has succeeded in the authentication (step S112). The user management server 120 reads out and replies the connection information corresponding to the user ID included in the address acquisition request from the user management information in response to the transmitted address acquisition request (step S113).

In a case where the information acquisition unit 113 acquires the connection information as described above, the VPN connection unit 112 transmits a VPN connection request including the authentication data included in the connection information to the control apparatus 210 specified by the IP address included in the acquired connection information (step S114).

In a case where the VPN connection request is transmitted from the image processing apparatus 110, the VPN connection unit 211 in the control apparatus 210 performs authentication for performing the VPN connection based on the authentication data (step S115). In a case where the authentication has succeeded, the VPN connection unit 211 replies the authentication success. Accordingly, the image processing apparatus 110 establishes the VPN connection with the VPN connection unit 211 (step S116).

In a case where the VPN is connected as described above, the image processing apparatus 110 performs image processing under the control of the control apparatus 210. Here, typical image processing performed under execution control of the control apparatus 210 will be described.

Although not shown in FIG. 1, a program management server is provided on the cloud. The program management server manages a plurality of image processing programs. Each image processing program is associated with identification information (for example, a user ID) of a user who can use the program.

In a case where the authentication information is acquired from the image processing apparatus 110, the program management server replies an access path (for example, a URL, an IP address, a port number, or the like) to the image processing program corresponding to the user ID included in the authentication information to the image processing apparatus 110.

The authentication information used herein is authentication information for logging in to and using the image processing apparatus 110. The authentication information used in step S111 described above is authentication information used for selecting a correct VPN connection destination. In the present exemplary embodiment, the authentication information managed by the user management server 120 is used in common for the sake of convenience, but it is not necessary to use the identical authentication information for performing the VPN connection and logging in to the image processing apparatus 110.

The image processing apparatus 110 transmits, to the control apparatus 210, a connection request with the image processing program by using the user ID and the access path acquired from the program management server. For example, Hypertext Transfer Protocol Security (HTTPS) may be used for the connection request from the image processing apparatus 110 to the control apparatus 210.

In a case where the connection request with the image processing program is received from the image processing apparatus 110, the control apparatus 210 performs the user authentication, and in a case where the authentication has succeeded, the control apparatus replies, from the control apparatus 210 to the image processing apparatus 110, information indicating the connection success as a response to the connection request. More specifically, in a case where an access key acquired as a usage reservation from the program management server by using the acquired access path and an access key included in the connection request received from the image processing apparatus 110 match, the control apparatus 210 replies the information indicating the connection success to the image processing apparatus 110.

In a case where the information on the connection success is replied, the image processing apparatus 110 transmits, to the control apparatus 210 that executes the image processing program, the apparatus information indicating the apparatus configuration of the image processing apparatus retained inside.

The image processing control unit 213 in the control apparatus 210 controls the execution of the image processing in the image processing apparatus 110 by controlling a device such as a print engine or a scanner included in the image processing apparatus 110 according to the image processing program managed by the program management server as described above.

That is, the image processing control unit 213 in the control apparatus 210 determines a function or a service to be provided to the image processing apparatus 110 based on the apparatus information and the contract information and provides image data of a user interface image corresponding to the function or the service to be provided to the image processing apparatus 110 by executing the connected image processing program. The image processing control unit 213 limits the operation by the image processing apparatus 110 according to the function or the service to be provided.

The information acquisition unit 212 may acquire contract information before the image processing control unit 213 controls the image processing. For example, the image processing apparatus 110 may acquire the contract information together with the connection request at the time of VPN connection, and may transmit the contract information together with the authentication data when requesting the VPN connection (step S114).

For example, in a case where it is found that the image processing apparatus 110 has both a monochrome printing function and a color printing function by referring to the apparatus information, the image processing control unit 213 controls the execution of the monochrome printing or the color printing in response to a user operation by providing a user interface image including an operation button of the monochrome printing and an operation button of the color printing to the image processing apparatus 110.

For example, even though the image processing apparatus 110 has both the monochrome printing function and the color printing function, in a case where it is found that the user contracts only a monochrome printing service and does not contract a color printing service by referring to the contract information, the control may be performed such that the execution of the color printing is limited (prohibited) by providing, to the image processing apparatus 110, a user interface image for activating the operation button of the monochrome printing and deactivating the operation button of the color printing. In order to deactivate the operation button of the color printing, for example, a method for hiding the operation buttons or dimming a display color to indicate non-selectable may be used.

In a case where the user interface image is provided, the image processing unit 111 in the image processing apparatus 110 displays the user interface image on a display device such as a touch panel. For example, processing corresponding to the operation from the user obtained via the user interface image is executed.

In a case where there is the user operation, the image processing unit 111 transmits operation information on the user operation to the control apparatus 210. Examples of the operation information include touch information indicating a type of an operation on the touch panel (for example, touch operation or release operation) and coordinate information indicating a position on the touch panel on which the operation corresponding to the touch information is performed. For example, the image processing unit 111 transmits, as an HTTP request, the operation information to the control apparatus 210.

In a case where the operation information is received, the image processing control unit 213 in the control apparatus 210 controls the image processing in the image processing apparatus 110 by executing the processing corresponding to the operation information. For example, the image processing control unit 213 updates the user interface image as necessary according to the operation information obtained from the image processing apparatus 110, and provides the updated user interface image to the image processing apparatus 110. For example, in a case where a plurality of pieces of operation information are continuously obtained, the image processing control unit 213 may omit a part of the update related to the user interface image and reduce a load of drawing processing.

In a case where the user performs an operation of disconnecting the image processing program after ending intended image processing, the image processing apparatus 110 disconnects the connected image processing program. Accordingly, the image processing is ended.

The typical image processing performed by connecting the image processing apparatus 110 and the control apparatus 210 via VPN and under execution control of the control apparatus 210 has been described above. Next, specific image processing in the present exemplary embodiment will be described.

The image processing performed by the image processing apparatus 110 can be approximately divided into a pattern in which data communication is performed between the image processing apparatus 110 and the control apparatus 210 via VPN by a user logging in to the image processing apparatus 110 and then selecting an image processing function, and a pattern in which a user logs in to the image processing apparatus 110 and then selects an image processing function after performing data communication between the image processing apparatus 110 and the control apparatus 210 via VPN. It is conceivable that the former is, for example, a case where the user selects the scanning function of the image processing apparatus 110 and transmits scan data generated by scanning from the image processing apparatus 110 to the control apparatus 210 via VPN. The latter is, for example, a case where the user wants to use a security print function. That is, the image processing apparatus 110 receives a print job on the side of the company LAN system 200 in advance from the control apparatus 210 via the VPN and stores the received print job. After that, the user selects the security print function of the image processing apparatus 110 and causes the image processing apparatus 110 to perform printing. As described above, the security print function corresponds to a function in which a print job needs to be transmitted from the control apparatus 210 to the image processing apparatus 110 before execution.

Figure 4A:
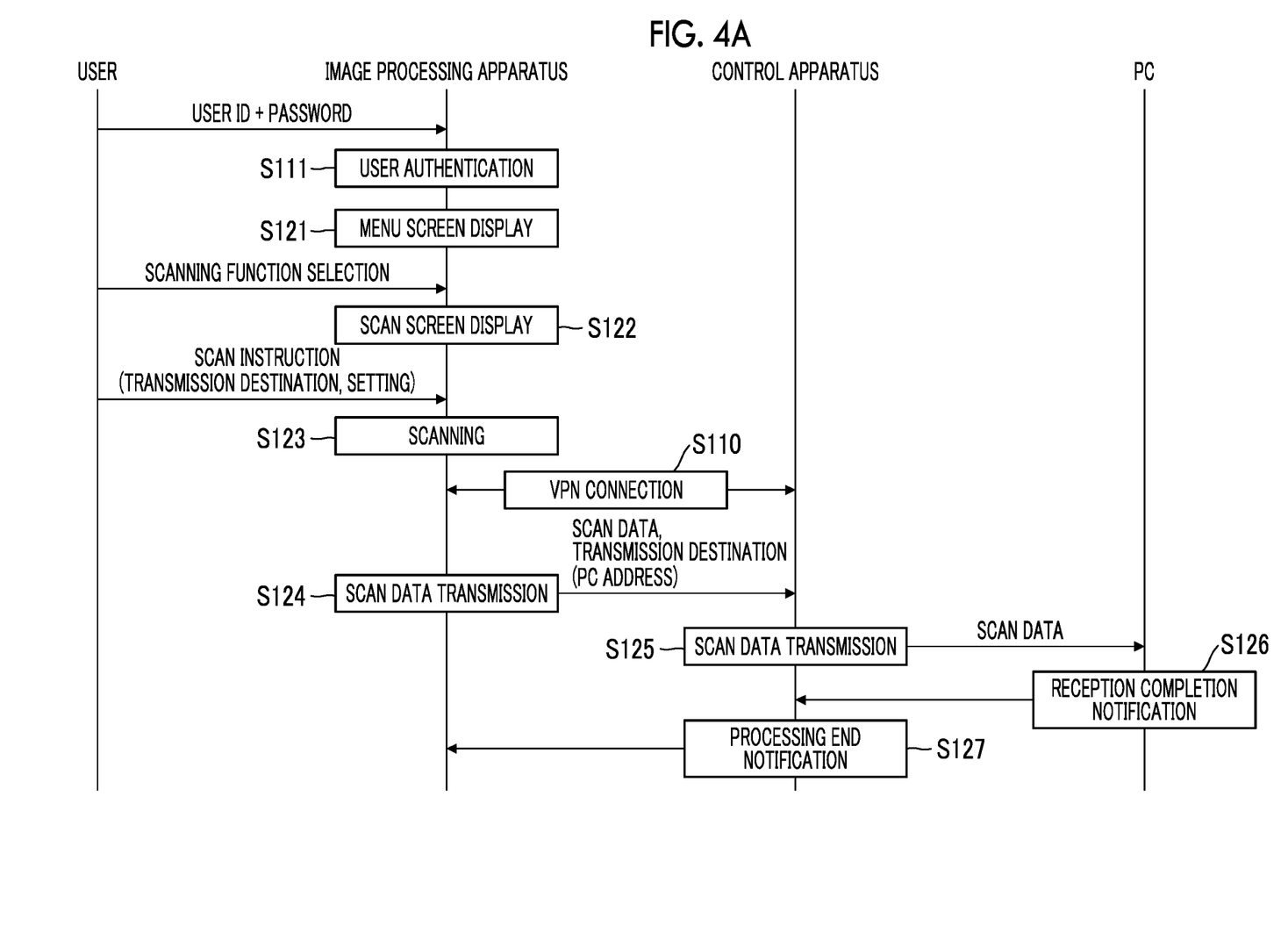
FIG. 4A is a sequence diagram showing image processing performed at the time when a scanning function is executed in the present exemplary embodiment.
Figure 4B:
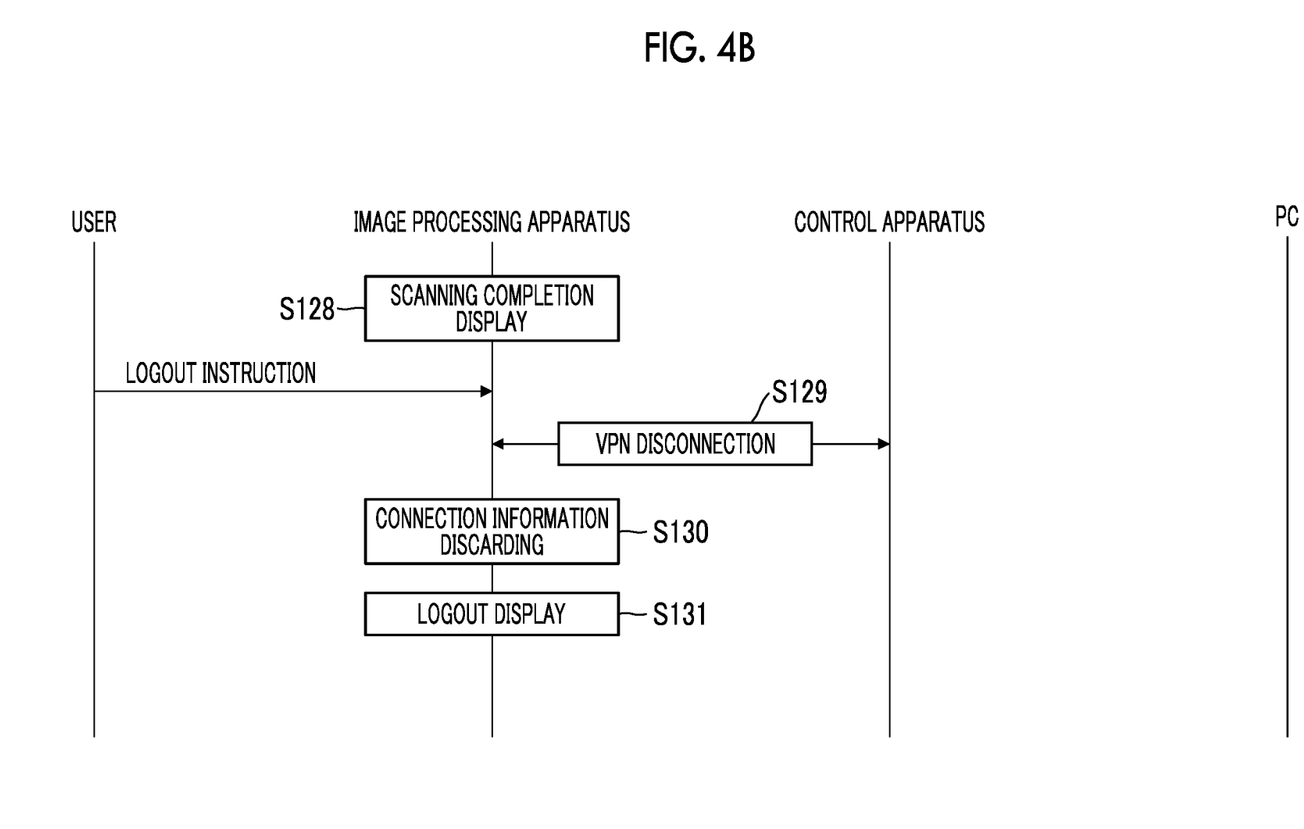
FIG. 4B is a sequence diagram following FIG. 4A.

First, the former image processing performed by selecting the scanning function will be described with reference to the sequence diagrams shown in FIGS. 4A and 4B. In addition, the identical step number is assigned to the processing identical to the processing shown in FIG. 3.

First, the user inputs authentication information, that is, a user ID and a password from a predetermined screen. The image processing apparatus 110 performs the user authentication by collating a set of the input user ID and password with the authentication information registered in the user management information (step S111). The user authentication performed here is positioned as user authentication performed for using the image processing apparatus 110. Here, the description will be continued on the assumption that the authentication has succeeded, that is, the image processing apparatus 110 has been logged in.

In a case where the login has succeeded, the image processing apparatus 110 displays a menu screen, more specifically, a main menu screen prepared by the image processing apparatus 110 on the operation panel (step S121).

Subsequently, the user selects a scanning function, for example, by selecting a scan icon from the menu screen. The image processing apparatus 110 displays a scan screen, that is, a menu screen for the scanning function on the operation panel in response to this selection operation (step S122).

Subsequently, the user sets a transmission destination of the scan data and options for executing the scanning as needed from the scan screen. The transmission destination may be manually input by the user from a predetermined input field, or in a case where the transmission destination is pre-registered in the image processing apparatus 110, an intended transmission destination may be selected from the transmission destination list. In the present exemplary embodiment, a case where the user designates the PC 220 of the user used in the company LAN system 200 as the transmission destination will be described as an example.

Subsequently, the user selects a predetermined execution button. The image processing apparatus 110 executes scanning in response to an execution instruction of the scanning selected by the user (step S123). The processing until the scanning is executed may be the identical as before.

In a case where the scanning of the sheet to be transmitted is completed, the VPN connection unit 112 connects the image processing apparatus 110 and the control apparatus 210 via VPN according to the procedure described with reference to FIG. 3 (step S110). User authentication may not be executed because it is duplicated.

In a case where the VPN is normally connected, the image processing apparatus 110 transmits data generated by scanning (hereinafter, "scan data") to the control apparatus 210 via the VPN (step S124). At this time, the transmission destination designated by the user is added and transmitted.

In a case where the scan data is received, the control apparatus 210 transfers the scan data to the transmission destination added to the scan data (step S125).

In a case where the scan data is received, the PC 220 replies a reception completion notification to the control apparatus 210. In a case where the reception completion notification is received (step S126), the control apparatus 210 replies a processing end notification indicating that the PC 220 has received the scan data to the image processing apparatus 110 (step S127).

In a case where it is recognized that the scanning function executed in response to the user instruction has been normally completed in the company LAN system 200 as described above, the image processing apparatus 110 displays a message on the operation panel indicating that the scanning function has been normally completed (step S128).

The user who sees this message instructs the image processing apparatus 110 to log out. The VPN connection unit 112 disconnects the VPN in response to the logout instruction (step S129), and discards the connection information used for the VPN from the image processing apparatus 110 (step S130). Accordingly, it is possible to prevent leakage of connection information that may occur by leaving the image processing apparatus 110 in a state of being left behind. After that, the image processing apparatus 110 logs out the user in response to the logout instruction, and displays a message to that effect on the operation panel (step S131).

As described above, the image processing apparatus 110 connects the VPN according to the user's selection of the scanning function and executes the scanning function processing.

The scanning function includes processing of transmitting data from the image processing apparatus 110 to the control apparatus 210, and the image processing apparatus 110 may connect the VPN with the control apparatus 210 between the time when the scanning function is selected and the time before the data is transmitted. In the present exemplary embodiment, the VPN connection (step S110) is performed after the sheet scan is completed. That is, the VPN is connected only while exchanging data communication, here scan data and notification. Accordingly, the time during which the VPN is connected can be shortened. However, the timing of connecting the VPN is not limited thereto, and for example, the VPN connection (step S110) may be performed immediately after the user selects the scanning function. In this case, in a case where the VPN connection fails, it is not necessary for the user to perform processing such as designating the transmission destination and scanning the sheet.

Further, in step S111, the image processing apparatus 110 may be processed so as to acquire the connection information together when receiving the result of the user authentication from the user management information. However, even though the connection information is acquired, the VPN is not connected before the user selects the scanning function, so that the VPN is connected for a short time.

Figure 5A:
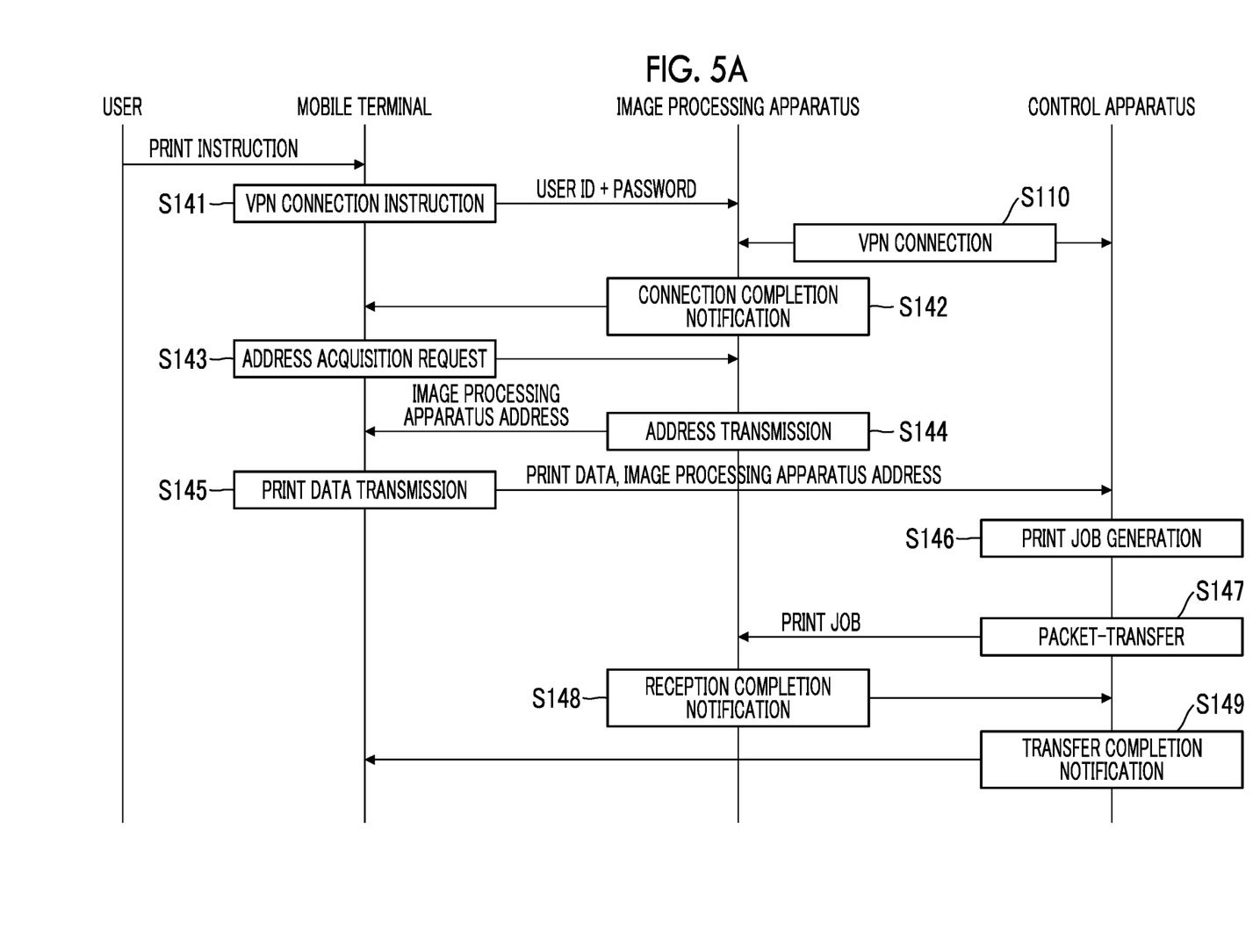
FIG. 5A is a sequence diagram showing image processing performed at the time when a security print function is executed in the present exemplary embodiment.
Figure 5B:
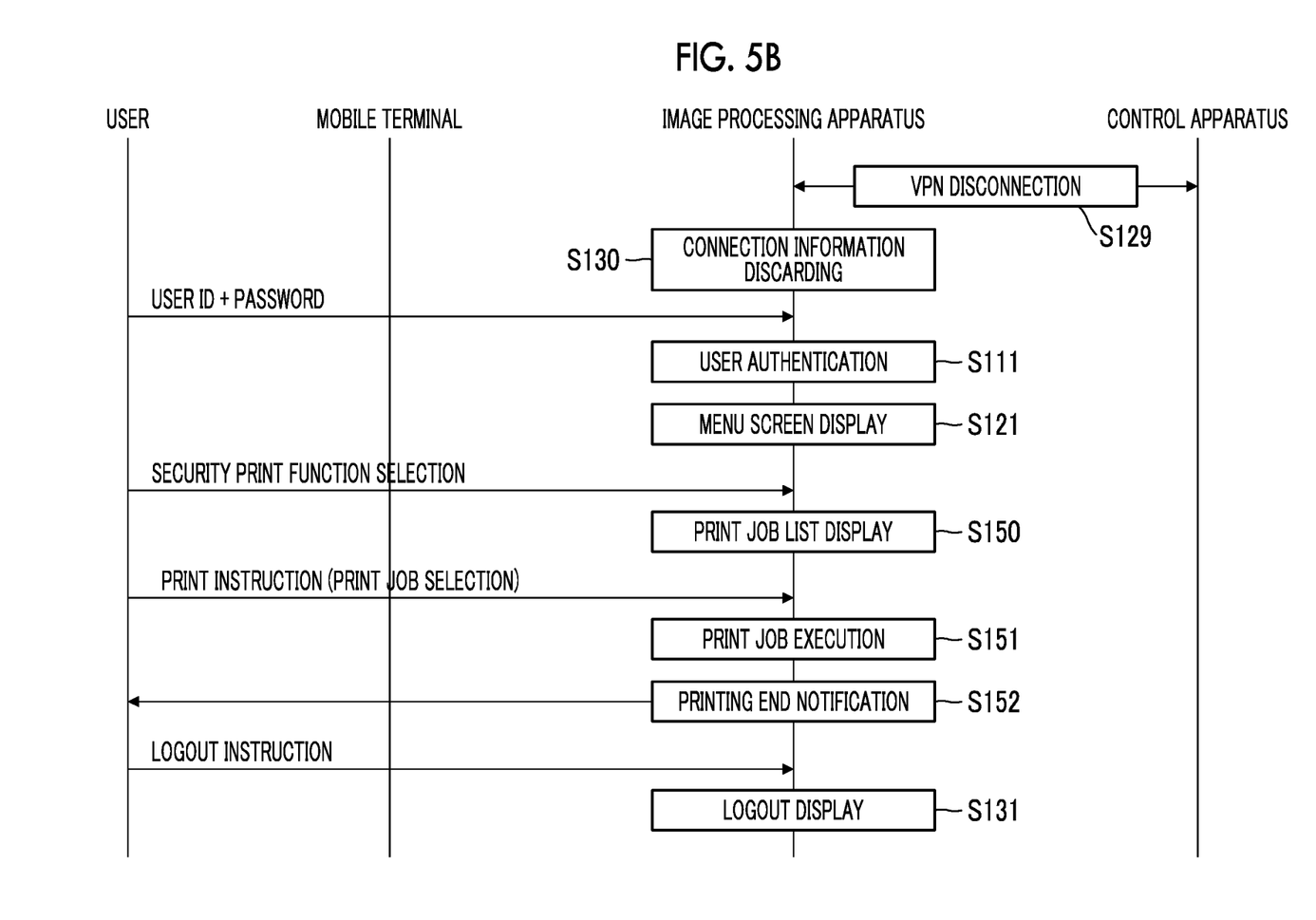
FIG. 5B is a sequence diagram following FIG. 5A.

Next, the latter image processing performed by selecting the security print function will be described with reference to the sequence diagrams shown in FIGS. 5A and 5B. In addition, the identical step numbers are assigned to the processing identical to the processing shown in FIGS. 3 and 4. In the present exemplary embodiment, since the image processing apparatus 110 does not have the function necessary for generating the print job, it is assumed that the control apparatus 210 generates the print job. Further, although not shown in FIG. 1, it is assumed that the data to be printed is stored in a mobile terminal brought into the coworking space by the user. Further, it is assumed that the mobile terminal and the image processing apparatus 110 can perform wireless communication by a wireless communication method such as Bluetooth (registered trademark).

First, the user issues a print instruction to the mobile terminal brought into the coworking space. This print instruction is a print instruction based on the security print function, and the user designates data to be printed. The mobile terminal designates authentication information (that is, a user ID and a password) and instructs the image processing apparatus 110 to make VPN connection in response to a print instruction from the user (step S141). Here, the authentication information sent by the mobile terminal to the image processing apparatus 110 is positioned as authentication for specifying the control apparatus 210 as the VPN connection destination.

The image processing apparatus 110 connects the image processing apparatus 110 and the control apparatus 210 by VPN according to the procedure described with reference to FIG. 3 in response to an instruction from the mobile terminal (step S110). Here, assuming that the VPN is normally connected, the image processing apparatus 110 sends a connection completion notification to the mobile terminal to the effect that the VPN connection is completed (step S142).

In a case where the VPN is normally connected, the mobile terminal transmits a request for acquiring an image processing apparatus address to the image processing apparatus 110 (step S143), and the image processing apparatus 110 replies the image processing apparatus address in response to the request (Step S144). The image processing apparatus address is, for example, an IP address of the image processing apparatus 110 that can identify the communication partner, and is information for the control apparatus 210 to specify the transmission destination of the print job, as will be described later. The image processing apparatus 110 may add the image processing apparatus address to the connection completion notification and transmit the resultant information without causing the mobile terminal to request the address acquisition.

Subsequently, the mobile terminal transmits the data to be printed (hereinafter, "print data") and the image processing apparatus address to the control apparatus 210 via the VPN established with the control apparatus 210 (step S145). Since the mobile terminal stores the IP address of the control apparatus 210 of the company, it is possible to establish VPN with the control apparatus 210 and directly transmit print data or the like to the control apparatus 210. Of course, processing may be performed so that transmission is performed via VPN connected between the image processing apparatus 110 and the control apparatus 210.

In a case where a print job is generated based on the transmitted print data (step S146), the control apparatus 210 packet-transfers the generated print job to the image processing apparatus 110 via the VPN (step S147).

In a case where the print job is received, the image processing apparatus 110 replies a reception completion notification to the control apparatus 210 (step S148). In a case where the reception completion notification is received from the image processing apparatus 110, the control apparatus 210 replies a transfer completion notification of the print job to the image processing apparatus 110 to the mobile terminal (step S149).

In a case where the transfer completion notification is sent, data communication is not performed via the VPN after that. Thus, the VPN connection unit 112 disconnects the VPN in cooperation with the VPN connection unit 211 (step S129), and discards the connection information used for the VPN from the image processing apparatus 110 (step S130).

After that, the user inputs, as the authentication information, a user ID and a password from a predetermined screen displayed by operating the operation panel of the image processing apparatus 110 when the user wants to print. The image processing apparatus 110 performs the user authentication by collating a set of the input user ID and password with the authentication information registered in the user management information (step S111). The user authentication performed here is positioned as user authentication performed for using the image processing apparatus 110. Here, the description will be continued on the assumption that the authentication has succeeded, that is, the image processing apparatus 110 has been logged in.

In a case where the login has succeeded, the image processing apparatus 110 displays a main menu screen on the operation panel (step S121).

Subsequently, the user selects a security print icon, for example, by selecting a security print function from the menu screen. The image processing apparatus 110 displays a list of print jobs corresponding to the data instructed to be printed by the user in response to this selection operation on the operation panel (step S150).

In a case where the user issues a print instruction by selecting a print job to be executed from the print jobs displayed in the list, the image processing unit 111 generates a printed matter by executing a print job designated in response to the print instruction (step S151).

After that, in a case where the execution of printing is completed, the image processing apparatus 110 notifies the user of the end of printing by displaying the effect on the operation panel (step S152).

In a case where the user knows that the execution of the intended print job has been completed by referring to the display on the operation panel, the user operates the operation panel of the image processing apparatus 110 to issue an instruction to log out. The image processing apparatus 110 logs out the user in response to the logout instruction, and displays a message to that effect on the operation panel (step S131).

As described above, the image processing apparatus 110 executes the security print function processing according to the user's selection of the security print function.

According to the present exemplary embodiment, in the function selected by the user, the VPN is connected only while it is necessary to perform data communication via the VPN. Accordingly, it is safe in terms of security, and since the VPN is automatically connected and disconnected, the convenience of the user may be improved.

In the present exemplary embodiment, although the case where the image processing apparatus 110 is installed in a coworking space which is a shared space has been described as an example, in a case where the connection can be made via VPN, the installation location of the image processing apparatus 110 need not be limited to the shared space.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
    a first processor that is mounted on an image processing apparatus including at least one of an image forming unit that performs processing of forming an image on a medium or an image scanning unit that performs processing of scanning an image on a medium; and
    a second processor that is mounted on a control apparatus that is connected to the image processing apparatus via a virtual leased line, and controls a part of at least one of the processing of forming an image on a medium or the processing of scanning an image on a medium performed by the image processing apparatus, wherein
    the first processor is configured to:
        control a timing of connection using the virtual leased line with the control apparatus according to a function used by a user among functions of the image processing apparatus.

2. The image processing system according to claim 1, wherein the first processor is configured to:
    in a case where a function selected by the user includes processing of transmitting data from the image processing apparatus to the control apparatus, connect the virtual leased line with the control apparatus between a time when the function is selected and a time before the data is transmitted; and transmit the data to the control apparatus via the connected virtual leased line by executing the selected function.

3. The image processing system according to claim 2, wherein the first processor is configured to:
disconnect the virtual leased line from the control apparatus after a reception completion notification of the data is transmitted from the control apparatus.

4. The image processing system according to claim 3, wherein the first processor is configured to:
disconnect the virtual leased line from the control apparatus when the user logs out of the image processing apparatus.

5. The image processing system according to claim 2, wherein the function selected by the user is a scanning function, and
the first processor is configured to transmit data generated by scanning to the control apparatus.

6. The image processing system according to claim 2, wherein the first processor is configured to:
receive information regarding a connection using the virtual leased line in response to an operation of the user; and
even though the information regarding the connection using the virtual leased line is received, prevent the connection using the virtual leased line from being made before the user selects the function.

7. The image processing system according to claim 1, wherein the first processor is configured to:
in a case where the user uses a function that requires data to be transmitted from the control apparatus to the image processing apparatus before the function is executed, connect the virtual leased line with the control apparatus in response to an instruction given by the user before the function is executed;
receive the data from the control apparatus via the connected virtual leased line; and
execute the function by using the data received by the image processing apparatus in response to the user logging in to the image processing apparatus and selecting the function.

8. The image processing system according to claim 7, wherein the first processor is configured to:
disconnect the virtual leased line from the control apparatus after the data is normally received from the control apparatus.

9. The image processing system according to claim 7, wherein the function selected by the user is a security print function, and
the data is a print job executed by the image processing apparatus.

10. A non-transitory computer readable medium storing a program causing a computer to achieve a function, the computer including at least one of an image forming unit that performs processing of forming an image on a medium or an image scanning unit that performs processing of scanning an image on a medium, and causing a control apparatus to control a part of at least one of the processing of forming an image on a medium or the processing of scanning an image on a medium via a virtual leased line, the function comprising:
controlling a timing of connection using the virtual leased line with the control apparatus according to a function used by a user among the functions of the computer.

11. An image processing system comprising:
a first processor that is mounted on an image processing apparatus including at least one of an image forming unit that performs processing of forming an image on a medium or an image scanning unit that performs processing of scanning an image on a medium; and
a second processor that is mounted on a control apparatus that is connected to the image processing apparatus via a virtual leased line, and controls a part of at least one of the processing of forming an image on a medium or the processing of scanning an image on a medium performed by the image processing apparatus, wherein the first processor includes:
means for controlling a timing of connection using the virtual leased line with the control apparatus according to a function used by a user among functions of the image processing apparatus.

* * * * *